United States Patent [19]

Wilcox

[11] Patent Number: 4,773,122
[45] Date of Patent: Sep. 27, 1988

[54] CONDUCTIVE CASTER

[75] Inventor: Jeffrey S. Wilcox, East Grand Rapids, Mich.

[73] Assignee: Herman Miller, Inc., Zeeland, Mich.

[21] Appl. No.: 915,718

[22] Filed: Oct. 3, 1986

[51] Int. Cl.⁴ ............................................. B60B 33/04
[52] U.S. Cl. ..................................... 16/18 R; 361/217
[58] Field of Search ................... 16/18 R, 18 CG, 47, 16/31 R, 31 A, 40, 41, 42 R, 42 T; 152/DIG. 2; 361/217, 219, 220, 221; 174/6; 301/36 R, 63 DT; 191/1 R

[56] References Cited

U.S. PATENT DOCUMENTS

| 608,234 | 8/1898 | Slayton . | |
|---|---|---|---|
| 619,896 | 2/1899 | Lee . | |
| 1,744,004 | 1/1930 | Hunt . | |
| 1,976,154 | 10/1934 | Walters | 361/217 |
| 2,216,363 | 10/1940 | Crawford | 16/18 R |
| 2,267,503 | 12/1941 | Lytle . | |
| 2,302,003 | 11/1942 | Cadwell et al. . | |
| 2,324,589 | 7/1943 | Lytle . | |
| 2,533,403 | 12/1950 | Schultz . | |
| 2,541,278 | 2/1951 | Palmgren et al. . | |
| 2,686,891 | 8/1954 | Burgin . | |
| 2,714,181 | 7/1955 | Azbill . | |
| 2,751,523 | 6/1956 | Adams . | |
| 2,786,161 | 3/1957 | Lunden . | |
| 2,802,148 | 8/1957 | Allder . | |
| 3,010,700 | 11/1961 | Petersen . | |
| 3,780,345 | 12/1973 | Earman | 361/220 |

FOREIGN PATENT DOCUMENTS

| 55-63931(4) | 1/1980 | Japan . | |
|---|---|---|---|
| 799408 | 8/1958 | United Kingdom | 361/217 |

Primary Examiner—Nicholas P. Godici
Assistant Examiner—Carmine Cuda
Attorney, Agent, or Firm—Varnum, Riddering, Schmidt & Howlett

[57] ABSTRACT

A two wheel roller caster (10) for use in supporting movable objects on a floor having a conductive band (56) which has two ends and is mounted between two wheels (16) so as to provide conductive contact between the movable object and the floor. A conductive path (60, 58, 56) connects a stem (14) to the connective band (56).

9 Claims, 1 Drawing Sheet

U.S. Patent      Sep. 27, 1988      4,773,122
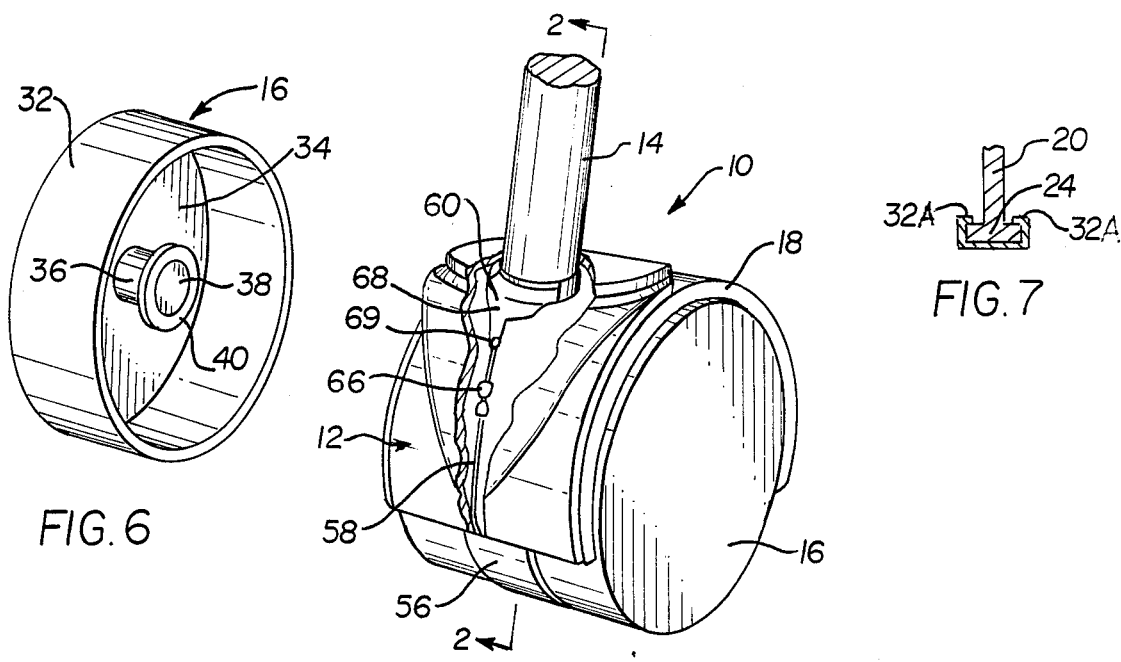
FIG. 6
FIG. 1
FIG. 7
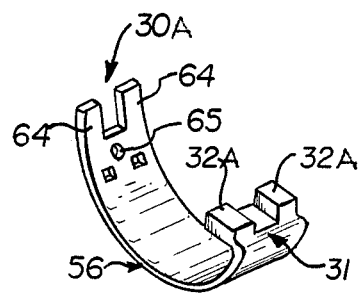
FIG. 5
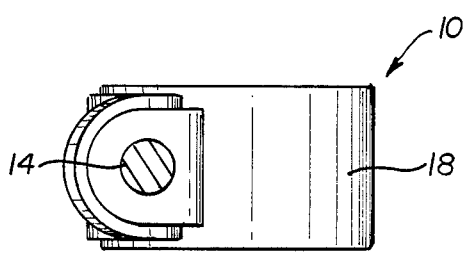
FIG. 4
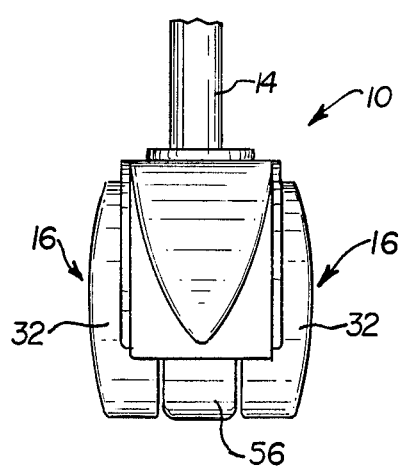
FIG. 3
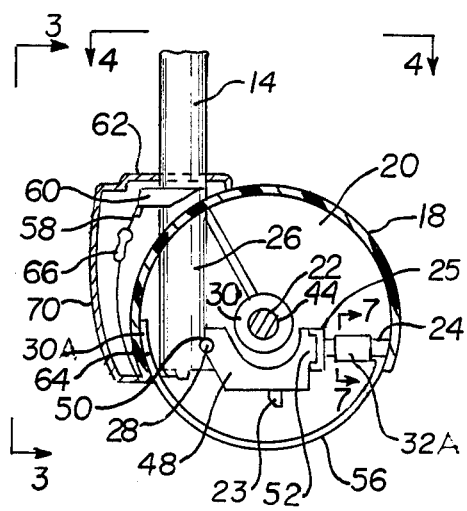
FIG. 2

CONDUCTIVE CASTER

FIELD OF THE INVENTION

This invention relates to two wheel casters with static protection. In one of its aspects, the invention relates to a two wheel caster wherein a conductive strap is provided between two wheels of the caster so as to maintain continuous sliding contact with the floor, thereby maintaining the conductive strap free of foreign debris buildup which might otherwise impair the discharge of static electricity.

BACKGROUND OF THE INVENTION

Static electricity buildup can be a problem in both office and factory environments. In the office environment, static buildup can occur simply as a result of an occupant using a chair or other equipment. In a factory environment, static buildup can be a problem in certain types of equipment. In particular, the buildup of static electricity can be a problem in environments where computers, computerized equipment, electronic devices, or similar equipment is being either assembled or used.

It is, therefore, desirable to ground the object being supported so as to permit continuous discharge of static electricity and, thereby, prevent the buildup of an electrical charge. Continuous discharge is particularly important where the object, be it furniture or equipment, is movably mounted on casters.

Several caster devices have been developed to ground a chair leg and permit electrical discharge. For example, the U.S. Pat. No. 619,896, to Lee, issued Feb. 21, 1899, discloses a U-shaped metallic bail adapted to be mounted to the forks of a caster so as to trail along the floor behind the caster. The U.S. Pat. No. 608,234, to Slayton, also discloses a metallic contact arm adapted to be mounted to a prong of a fork which supports a caster wheel. The U.S. Pat. No. 2,533,403, to Schultz, also discloses a metallic link which is oval-shaped and mounted to one side of a caster wheel. Each of these devices, however, is susceptible to the buildup of wax, dirt, or other foreign matter which can render the electrical discharge function ineffective.

Certain devices have utilized means other than conductive members to ground the movable object. For example, the U.S. Pat. No. 2,324,589, to Lytle, discloses a conductive wheel having a spiral link embedded within a web thereof so as to conductively connect the rim of the wheel to the hub. Similarly, the U.S. Pat. No. 2,267,503, to Lytle, discloses a conductive wheel rim which is coated with a thermostat conductive powder.

The U.S. Pat. No. 2,818,534, to Horne, is directed to a conductive bonding arrangement to bond chair legs and tables to a floor surface in a manner so as to avoid buildup of static electricity. The patent describes a bonding arrangement having a sealed ceramic transistor, mounting plates, shunt wires between the mounting plates and buses contacting the floor surface to provide a conductive path. FIG. 8 of the Horne patent shows the use of casters, but those casters do not comprise any portion of the conductive path, and the conductive bonding arrangement is completely separate from the caster assemblies. The Lytle patents, together with the U.S. Pat. No. 2,686,891, to Burgin, describe rolling conductive elements which tend to buildup wax, dirt, or other films of insulative material. Electrically conductive casters, such as those disclosed in Gross Stabil Corporation catalog (333 Race Street, P.O. Box 368, Cold water, Mich. 49036), also disclose this type of rolling conductive contact.

SUMMARY OF THE INVENTION

According to the invention, there is provided a two wheel roller caster having anti-static properties and which avoids the buildup of wax, dirt and other debris. This caster is adapted for use in supporting movable objects, such as furniture or equipment. The caster includes a conductive band. This conductive band is mounted between the two wheels of the caster and provides conductive contact between the caster and the floor. A conductive path is also provided for conductively connecting the movable object to the conductive strap.

The caster can also include a housing which rotatably secures the wheels to the caster and a shroud which is mounted on the housing for protecting the conductive path. The conductive strap can be secured at one end to the housing and slidably secured at its other end between the shroud and housing.

The conductive strap is sized so that it has a somewhat larger radius of curvature than the wheels themselves. The strap, when in place, bulges outwardly somewhat and exerts a pressure against the floor when the caster is in use. In this manner, the conductive strap is maintained in substantially continuous sliding contact with the floor when the caster rolls along the floor.

The conductive strap has a crowned, cross-sectional shape. This shape causes the longitudinal edges of the strap to be raised somewhat with respect to the longitudinal axis of the strap. This configuration permits free movement of the caster in a plurality of directions.

The conductive path includes a conductive lead and can also include a resistor for impeding shocks resulting from electrical buildup. The conductive lead can be secured to a stem at an upper end thereof by means of a collar so as to insure adequate conductive contact between the conductive lead and the caster. A lower end of the conductive lead is secured by the housing to the conductive band.

The conductive band is so positioned and sized so as to maintain substantially continuous sliding contact with the floor when the wheels of the caster are rotated. This sliding motion acts to perform a scraping function which prevents the buildup of wax, film, or other foreign matter which may act as an insulating barrier preventing the discharge of static electrical buildup.

BRIEF DESCRIPTION OF THE DRAWINGS

The invention will now be described with reference to the accompanying drawings in which:

FIG. 1 is a perspective view, partially broken away, of a caster according to the invention;

FIG. 2 is a side sectional view of the caster shown in FIG. 1;

FIG. 3 is a view taken along line 3—3 of FIG. 2;

FIG. 4 is a view taken along line 4—4 of FIG. 2;

FIG. 5 is a perspective view of a conductive strap according to the invention.

FIG. 6 is a perspective view of a wheel according to the invention; and

FIG. 7 is a sectional view taken along line 7—7 of FIG. 2.

DETAILED DESCRIPTION OF THE DRAWINGS

Referring now to the drawings and to FIG. 1 in particular, there is shown a caster 10 adapted for movably supporting objects such as chairs or tables. The caster 10 comprises a housing 12, a stem 14, and a pair of wheels 16. The housing 12 rotatably supports the wheels 16, and the stem 14 is adapted to support a chair or other furniture item which receives the stem 14 through a socket.

Referring now to FIGS. 1 and 2, the housing 12 has a semi-cylindrical outer shell 18 with a central partition webbing 20 extending diametrically across the shell. A central opening 22 is provided in the webbing 20. A ridge 24, formed by a pair of outwardly directed flanges is formed at a bottom front portion of the webbing 20. A vertical socket 26 is formed at a rear portion of the webbing 20 and extends upwardly through the cylindrical shell 18. A pair of laterally extending retaining pins 28 are positioned at a bottom portion of the webbing 20 and the socket 26. A resilient projection 23 extends downwardly from the webbing 20. A C-shaped portion is formed of a front, lower portion of webbing 20.

Each of the wheels 16 comprises an outer rim 32, circular outer wall 34, and a central hub 36. A central opening 38 is formed in the central hub 36, and an annular flange 40 is formed on the inner end of the hub 36.

An axle 44 is positioned within the central opening 22 of the housing web 20 and is adapted to fit within the central opening 38 of the wheels 16. The annular flange 40 abuts a boss 30 on the webbing 20 to space the outer rims 32 of the wheels a given distance apart, as illustrated in FIG. 1.

A retainer 48 has an indentation 50 at one end and a projection 52 at the other end. The indentation 50 snap-fits with retaining pin 28. The projection 52 fits within the C-shaped portion 25 of the housing partition webbing 20. Further, the bottom portion of the retainer 48 has a slot which receives and is retained by the projection 23 of the housing partition webbing 20. When the retainer 48 is snapped into place, as illustrated in FIG. 2, it fits between the circular outer wall 34 and the annular flange 40 of the wheel 16 to retain the wheel on the axle 44.

The stem 14 fits within the socket 26 and is retained therein through conventional means, such as a snap-ring.

The foregoing description has described a conventional two-wheel caster of a type manufactured by Herman Miller, Inc. of Zeeland, Mich. These casters are further described in U.S. Pat. No. 4,024,601, issued May 24, 1977 and U.S. Pat. No. 4,143,442, issued Mar. 13, 1979. These patents are incorporated herein by reference. According to the invention, an anti-static conductor assembly is provided in the two-wheel caster. The anti-static assembly comprises a conductive band 56, a conductive lead 58, a collar 60, and a shroud 62.

Conductive band 56 is formed of a suitable conductive material, such as aluminum, so as to provide sufficient electrical contact between the caster 10 and the floor (not shown). The band is in the form of an elongated strap having two ends 30A, 31. As can be seen in FIG. 5, the first end 30A has an upwardly extending U-shaped configuration formed by two upwardly extending prongs 64. Conductive band 56 has a aperture 65 extending therethrough below prongs 64. The opposite end 31 comprises a rearwardly extending portion having a pair of inwardly extending flanges 32A. A small aperture 65 extends through conductive band 56 near end 30A.

In use, end 30A slip-fits onto webbing 20 between socket 26 and shell 18. End 31 is secured to housing 12 by means of flanges 32A which snap-fit over ridge 24. The manner in which flanges 32A engage ridge 24 can best be seen in FIG. 7. In this manner, conductive band 56 can be easily snap-fit between wheels 16. Conductive band 56 is sized so that it has a radius of curvature when in place which is somewhat larger that the radius of curvature of wheels 16. Thus, in use, conductive band 56 is deformed outwardly somewhat so as to maintain continuous contact against a floor (not shown). The longitudinal edges of conductive strap 56 are curved somewhat upwardly with respect to the longitudinal axis thereof, as shown in FIG. 3. In this manner, the longitudinal edges of conductive band 56 do not interfere with the movement of caster 10. In particular, the longitudinal edges do not interfere with changes of direction of movement of the caster 10.

As can best be seen in FIGS. 1 and 2, a conductive lead 58 extends along the outer surface of semi-cylindrical shell 18 between stem 14 and conductive band 56. Conductive lead 58 can comprise a standard piece of conductive electrical wire. Conductive lead 58 can further comprise a resistor 66 having a desired resistance. A lower end of conductive lead 58 extends through aperture 65 in conductive band 56. In this manner, the lower end of conductive lead 58 is secured in intimate conductive contact with conductive band 56. An upper end of conductive lead 58 is secured by twisting, soldering or otherwise secured in intimate conductive contact with a collar 60.

Collar 60 is securely mounted in intimate conductive contact with stem 14 as is herein further described. In use, conductive lead 58 provides a conductive path extending between conductive band 56 and stem 14.

Collar 60 comprises a circular metallic collar or cap having an aperture extending therethrough (not shown). Collar 60 is adapted to seat over stem 14 so that stem 14 extends upwardly through the aperture in collar 60. Collar 60 has a downwardly extending portion 68. Downwardly extending portion can have an aperture 69 extending therethrough. Aperture 69 is adapted to receive an upper end of conductive lead 58 therethrough. Conductive lead 58 can then be bent, twisted, soldered, or otherwise secured in intimate conductive contact with downwardly extending portion 68.

In use, collar 60, conductive lead 58, and conductive band 56 together form a conductive path permitting the discharge of electrical charge from stem 14 to a floor (not shown).

A shroud 62 is also provided. Shroud 62 comprises a hollow, plastic shell having a curved inner, or open, face adapted to seat against the outer surface of semi-cylindrical shell 18 and an outer surface 70 having an aperture at a top portion thereof adapted to receive stem 14. In use, shroud 62 seats over stem 14. Shroud 62 rests against semi-cylindrical shell 18 so that collar 60 and conductive lead 58 are concealed within, and protected by, outer surface 70 of shroud 62. In this manner, shroud 62 acts to prevent dust, foreign matter, or other material from contaminating lead 58 and collar 60. Further, shroud 62 prevents mechanical damage to the conductive path formed by stem 14, collar 60, lead 58 and conductive band 56.

Reasonable variations and modifications are possible within the scope of the forgoing disclosure and drawings without departing from the scope of the invention which is defined in the appended claims.

The embodiments of the invention in which an exclusive property or privilege is claimed are defined as follows:

1. A two-wheel roller caster for use in supporting movable objects such as chairs on a floor wherein said caster includes two wheels, an axle connecting said wheels, and a housing means, the improvement which comprises:
   a conductive band having two ends mounted to said housing between said two wheels for only providing continuous conductive sliding contact between said caster and said floor, one end of said conductive band being stationary with respect to said housing; and
   a conductive path means connecting said conductive band to said movable object so as to permit said movable object to be electrically grounded to said floor through said conductive band.

2. A two-wheel roller caster according to claim 1 wherein said conductive band is secured at one end thereof to said housing and slidably secured at an opposite end thereof to said housing.

3. A two-wheel roller caster according to claim 2 wherein said conductive band is shaped and sized so as to have a larger radius of curvature than said two wheels so that said conductive band deforms somewhat so as to conform to the shape of said floor thereby exerting continuous pressure against said floor when said caster is in use.

4. A two-wheel roller caster according to claim 3 wherein said conductive band is of a crowned, crosssectional shape so that longitudinal edges of said conductive band permit free movement of said caster in a plurality of directions.

5. A two-wheel roller caster according to claim 2 wherein said conductive path further comprises:
   a conductive lead; and
   a resistor means mounted in series in said conductive lead for limiting current flow therethrough.

6. A two-wheel roller caster according to claim 5 and further comprising a shroud means for protecting said conductive path means.

7. A two-wheel roller caster according to claim 1 wherein said conductive band is shaped and positioned so as to maintain continuous and pressurized sliding contact with said floor when said wheels are rotated so that said sliding motion maintains said conductive band relatively free of foreign debris buildup.

8. A two-wheel roller caster according to claim 7 wherein said two wheels, said housing, and said shroud means substantially conceal said conductive band and said conductive path means from view when said caster is in use.

9. A two-wheel roller caster for use in supporting movable objects such as chairs on a floor wherein said caster includes two wheels, an axle connecting said wheels, and a housing means, the improvement which comprises:
   a conductive band having two ends mounted to said housing between said two wheels for providing continuous conductive sliding contact between said caster and said floor, said conductive band is of a crowned, cross-sectional shape so that longitudinal edges of said conductive band permit free movement of said caster in a plurality of directions; and
   a conductive path means connecting said conductive band to said movable object so as to permit said movable object to be electrically grounded to said floor through said conductive band.

* * * * *